Figure 1:
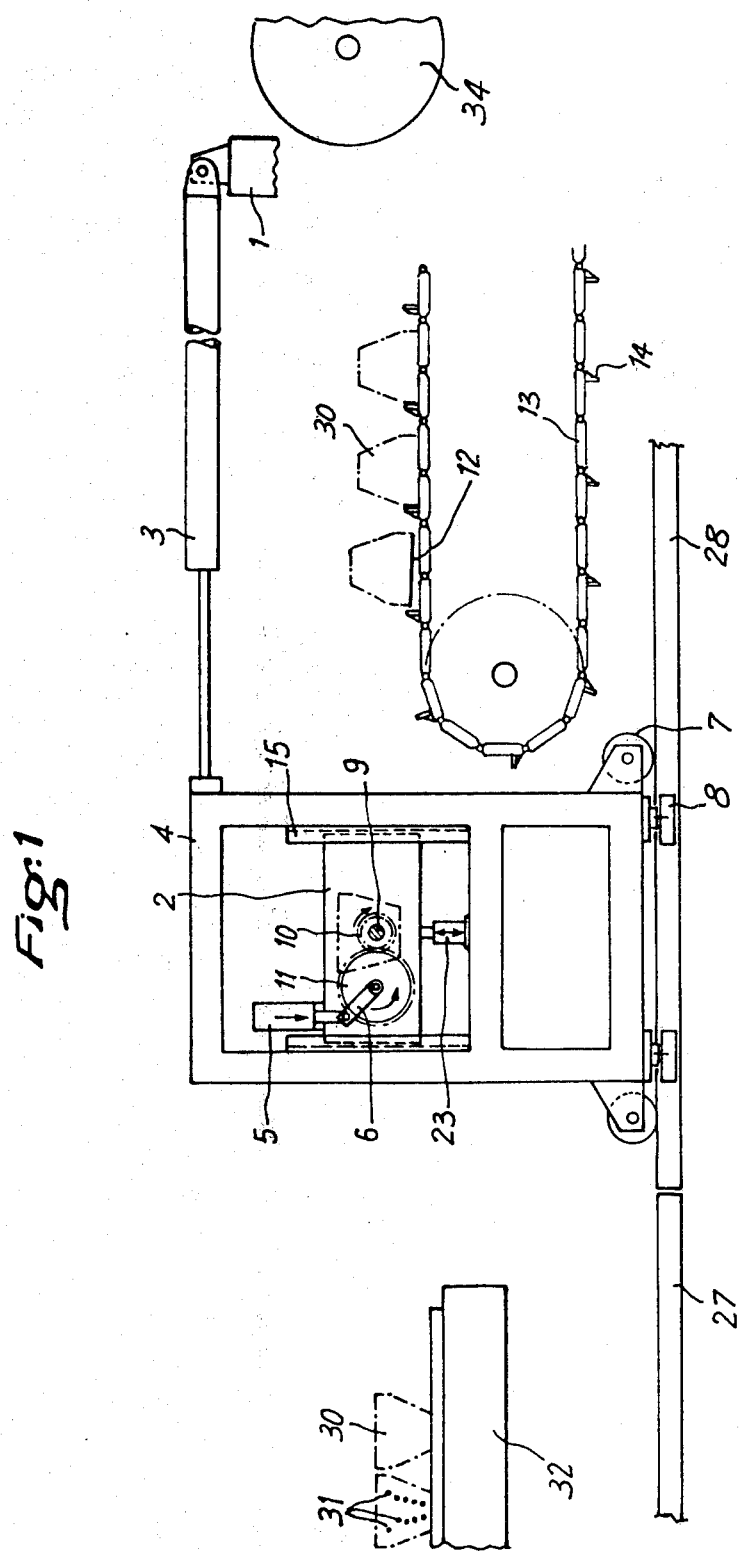

United States Patent

Feuillade

[11] 4,249,440
[45] Feb. 10, 1981

[54] DEVICE FOR HANDLING CROSS TIES OF PRESTRESSED CONCRETE OR ANALOGOUS PRODUCTS

[75] Inventor: Jean L. J. Feuillade, Cagnes, France

[73] Assignee: B. M. Costamagna et Cie, Cagnes, France

[21] Appl. No.: 21,825

[22] Filed: Mar. 19, 1979

Related U.S. Application Data

[63] Continuation of Ser. No. 830,057, Sep. 2, 1977, abandoned.

[30] Foreign Application Priority Data

Mar. 28, 1977 [FR] France .............................. 77 09137

[51] Int. Cl.³ ............................................. B26D 7/06
[52] U.S. Cl. ..................................... 83/155; 83/409; 83/411 R; 83/417; 83/421; 83/425.2; 83/435.2; 198/403; 198/456; 414/564; 414/763

[58] Field of Search ................... 83/417, 411 R, 409, 83/433, 155, 418, 421, 425.2, 435.2; 144/209 A; 414/564, 561, 763; 198/403, 456

[56] References Cited

U.S. PATENT DOCUMENTS 3,037,538  6/1962  Graham ........................... 144/209 A
3,842,874  10/1974  Noriyuk et al. .................. 144/209 A Primary Examiner—J. M. Meister
Attorney, Agent, or Firm—Darby & Darby

[57] ABSTRACT

Apparatus for delivering ties after unmolding from a first location to a trimming station which includes a conveyor operative between the first location and the trimming station, a gantry having a pair of arms for grasping the ends of the tie, lifting the tie from the first location, rotating the tie and delivering it to said conveyor.

10 Claims, 2 Drawing Figures

DEVICE FOR HANDLING CROSS TIES OF PRESTRESSED CONCRETE OR ANALOGOUS PRODUCTS

This application is a continuation of my copending application Ser. No. 830,057, filed Sept. 2, 1977 now abandoned.

In the manufacture of railroad ties of prestressed concrete with technologically advanced means, there is obtained, on a prestress bench, ties which are removed from a mold automatically and deposited on a traverser, or tray.

At this stage, and for reasons which can relate to problems in removing the ties from the mold, the ties often appear placed horizontally upside down, i.e. the sole of the ties is turned upward. Moreover, the ends of the prestress wires project laterally from the end flanks of the ties.

In order to finish the ties made by this process and store them, it is advisable to turn them over and trim off the ends of the prestress wires flush with the end flanks. The object of the present invention is an apparatus for mechanically embodying the latter two operations.

The apparatus according to the invention comprises a cleated conveyor combined with a gantry travelling between the arrival point of the ties and the head of the conveyor. The gantry straddles the conveyor and is equipped with means for seizing the ties by pinching at their ends, raising them, causing them to rotate a given amount around their axis, and depositing them on lateral fixed supports. The ties are laterally positioned precisely on the supports. From these supports the ties are entrained by the cleats of the conveyor toward finishing mechanisms such as the trimming means which are themselves in a fixed position relative to the conveyor.

For the embodiment of the apparatus, the invention embodies the following arrangements:

(1) The gantry has two lateral arms, one on either side, which slide horizontally and coaxially under the influence of jacks and are actuated simultaneously in opposite directions. The arms are rotatable around their common axis and are borne by bearings sliding vertically on lateral legs of the gantry.

(2) At least one of the gantry lateral arms is actuated in rotation by a toothed wheel mounted in the bearing of the arm, and in which the said arm slides, the said wheel being actuated by any suitable means.

(3) The ends of the arms bear toothed pads mounted on the said arms by means of ball joints. The pads engage the ends of a tie.

(4) For the lateral positioning of the tie, one of the arms has an adjustable stop acting in conjunction with an element of the bearing carrying the said arm, and means are provided to cause the said arm to come into abutment with the stop independently of the other arm.

(5) A trimming means with two trimming heads is provided which is mounted on the chassis with interposed means for adjustment of the lateral position of the heads.

Figure 2:
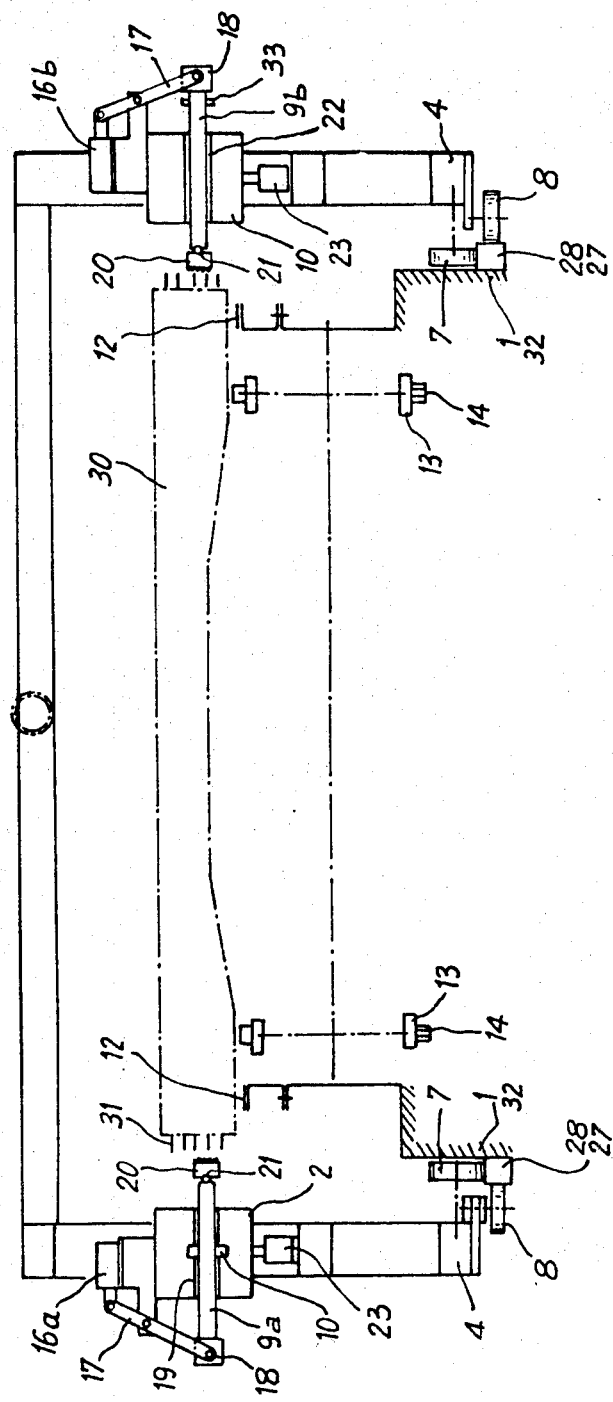

The invention is illustrated by the attached drawing in which:

FIG. 1 is an elevational schematic view of an example of the preferred embodiment of the apparatus of the invention; and FIG. 2 is an end view of the apparatus of FIG. 1.

Referring to the drawings, it is seen that the ties 30 arrive, after removal from a mold, on a traverser, tray or other means 32, on which they are disposed upside down, i.e. with their wider sole turned upward. The traverser means 32 can be the plate of a carriage and this plate can be a rotary plate making it possible to orient the ties suitably. The means 32 can run on rails 27 by any suitable means, not shown. At the ends of the ties 30, the sectioned prestress wires project in the form of points 31.

The apparatus according to the invention includes an endless conveyor 13, such as a double chain, equipped with cleats 14, moving parallel, in pairs. A gantry 4 straddles the conveyor 13 and runs on rails 27, 28 between the point of arrival of the ties 30, and the head of the conveyor 13. The reciprocating movement of the gantry is operated by jack 3 fixed on the main chassis of the conveyor (not shown for the sake of greater clarity). The distance of movement of the gantry is determined so that each tie 30 may be seized, as explained below, while on the traverser 32 and brought over the double-chain conveyor 13.

Gantry 4 is equipped with means so that, in the course of this reciprocation, it can seize the ties by their ends, raise them, then turn them 180° and position them laterally, and finally deposit them on supports 12 placed laterally on double chain 13. The ties 30 are then entrained by cleats 14.

More specifically, the gantry has arms 9a and 9b (see FIG. 2) mounted coaxially and oppositely on each side of the gantry. These arms 9a, 9b slide in a respective chassis 2 which chassis are themselves mounted slidably vertically in slideways 15 (FIG. 2) borne by gantry 4. The vertical movement of the chassis 2 on each side of the gantry is insured by a respective jack 23 which causes a chassis to rise and descend. The reciprocating movement of the arms or shafts 9a and 9b which slide in chassis 2 by means of collars 19 and 22 is insured by links 17 acting on sleeves 18 in which the ends of shafts 9a and 9b rotate thus leaving shafts 9a and 9b free to rotate around their common axis. Links 17 are actuated by the respective jacks 16a and 16b.

Arms 9a and 9b terminate in heads 20 equipped with teeth and mounted to swivel at 21, on the ends of arms 9a and 9b. The teeth are preferably pointed.

The operation of the apparatus is as follows. Jacks 16a and 16b being actuated, arms 9a and 9b slide toward one another and the heads 20 seize on a tie by its ends. Jacks 23 then go into action and the tie is lifted. The gantry then moves from the delivery point of tray 32 under the influence of jack 3 toward double chain 13.

In the course of this movement, a gear 10 mounted to slide with arm 9a insures the rotation of the latter under the influence of a gear (see FIG. 1) which is itself driven by a link 6 connected by a pivot to the shaft of a jack 5, itself fixed on gantry 4. The combined action of jack 5 and the link 6 and gears 10, 11 causes 180° rotation of the tie around the common axis of arms 9a and 9b.

When the movement of translation of the gantry is completed, as determined by a limit switch (not shown) for example, the chassis 2 is lowered by the action of jack 23 and the tie is delivered to rest on support 12 which is attached to the main chassis 1, where it is to be entrained by the cleats 14 fixed to the links 13 of the double chain.

At this stage, the tie is centered above the double chain which is to carry it to the trimming station under desired conditions of precision (centering to within about 1 millimeter). In the preferred embodiment, the centering is accomplished after the tie is deposited on the supports. To do this, the jacks 16a and 16b perform the maneuver of opening of arms 9a and 9b, and pads 20. Arm 9b is first actuated by jack 16b in such a way that a stop 33 on arm 9b contacts against a corresponding piece on chassis 2 in which arm 9b slides. This separate operation of arm 9b by jack 16b is insured within the scope of an automatic cycle of operations by electrical or electronic means of known type. It insures the correct positioning of the tie on support 12. The position of stop 33 is preferably adjustable.

After arms 9a, 9b are open, the tie is then taken off support 12 as it is entrained by cleats 14 of double chain 13. It is precisely positioned laterally and it is therefore ready to undergo the operation of trimming of the points 31.

The trimming station (FIG. 1) comprises two sectioning heads containing sectioning disc 34 rotated by any suitable means (not shown). These heads are fixed on chassis 1 on either side of double chain 13, at a suitable height. They include means for adjusting the position of the discs which make it possible to insure the correct lateral position of each disc relative to the ties, and to take up any play.

The device represented constitutes only an example of one embodiment of the invention which can be accomplished with various alternatives or technical equivalents, particularly in the means of operation of arms 9, sliding chassis 2, and the rotation of arms 9.

Moreover, the invention has been described in relation to the manufacture of railroad ties. It goes without saying that the device of the invention is applicable to the manufacture of other products of prestressed concrete.

What is claimed is:

1. Apparatus for handling elongated articles such as ties or the like which are delivered to a first location comprising:

conveyor means, fixed support means, and gantry means for travelling between said first location and the head of the conveyor means, said gantry means including first means for seizing said articles at their ends, rotating a said seized article by a predetermined amount, delivering it to said fixed support means and positioning said article laterally relative to said fixed support means, said conveyor means including means for entertaining the article from said fixed support means.

2. Apparatus as in claim 1 wherein the entraining means of the conveyor means includes extending means, said fixed support located below the tops of said extending means, said first means of said gantry delivering the tie to said fixed support means from which it is entrained by the extending means of the conveyor means to be moved by the conveyor means.

3. Apparatus as in claim 1 wherein said gantry first means comprises a pair of arms, means mounting said arms for reciprocating movement in opposite directions of a common axis, a respective jack means for reciprocating each of said arms, means for vertically raising and lowering said arms and their respective jack means, and means for rotating said arms.

4. Apparatus as in claim 3 wherein said means for rotating said arms comprises a first gear mounted to the means for slidably mounting one of said arms, and means for rotating said first gear.

5. Apparatus as in claim 3 further comprising a toothed pad on the end of each arm for seizing the article at its ends, and a swivel joint connecting a pad to said arm.

6. Apparatus as in claim 3 wherein the said entraining means of the conveyor means includes extending cleats, said fixed support located below the tops of said cleats, said first means of said gantry delivering the article to said fixed support from which it is entrained by the cleats of the conveyor means to be moved by the conveyor means.

7. Apparatus as in claim 3 further comprising control means for controlling the lateral positioning of the article relative to said support means, said control means including an adjustable stop means operating during the reciprocating motion of one of said arms, and said means for reciprocating said arms independently moving said one arm before moving said arms apart.

8. Apparatus as in claim 1 further comprising means for trimming each end of a said article carried by said conveyor means, said trimming means located adjacent said conveyor means.

9. Apparatus as in claim 1 wherein said first means also raises the articles from said first location.

10. Apparatus as in claim 2 wherein the extending means of the conveyor comprises cleats.

* * * * *